(12) United States Patent
Rikemanson

(10) Patent No.: US 12,492,638 B2
(45) Date of Patent: Dec. 9, 2025

(54) OUTLET GUIDE VANE COOLER

(71) Applicant: GKN Aerospace Sweden AB, Trollhättan (SE)

(72) Inventor: Dennis Rikemanson, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 0 days.

(21) Appl. No.: 17/791,315

(22) PCT Filed: Jan. 27, 2021

(86) PCT No.: PCT/EP2021/051870
§ 371 (c)(1),
(2) Date: Jul. 7, 2022

(87) PCT Pub. No.: WO2021/151951
PCT Pub. Date: Aug. 5, 2021

(65) Prior Publication Data
US 2023/0203955 A1 Jun. 29, 2023

(30) Foreign Application Priority Data
Jan. 27, 2020 (GB) ..................................... 2001110

(51) Int. Cl.
*F01D 5/18* (2006.01)
*F01D 9/04* (2006.01)
*F01D 25/12* (2006.01)

(52) U.S. Cl.
CPC ............. *F01D 5/187* (2013.01); *F01D 9/041* (2013.01); *F01D 25/12* (2013.01); *F05D 2240/121* (2013.01); *F05D 2240/122* (2013.01); *F05D 2260/213* (2013.01)

(58) Field of Classification Search
CPC .......... F01D 5/187; F01D 9/041; F01D 25/12; F05D 2240/121; F05D 2240/122; F05D 2260/213
See application file for complete search history.

(56) References Cited

U.S. PATENT DOCUMENTS

| | | | | |
|---|---|---|---|---|
| 5,782,077 | A * | 7/1998 | Porte | F02C 7/185 |
| | | | | 60/39.83 |
| 10,280,757 | B2 * | 5/2019 | Kupratis | F01D 5/145 |
| 10,550,701 | B2 * | 2/2020 | Kiener | F01D 5/186 |
| 10,662,781 | B2 * | 5/2020 | Mongillo | F01D 25/24 |
| 11,149,566 | B2 * | 10/2021 | Bordoni | F01D 9/041 |

(Continued)

FOREIGN PATENT DOCUMENTS

| | | | | |
|---|---|---|---|---|
| CN | 115788599 A | * | 3/2023 | |
| EP | 469825 A | * | 2/1992 | F02C 6/08 |

(Continued)

OTHER PUBLICATIONS

International Search Report and Written Opinion mailed May 26, 2021 for PCT/EP2021/051870 (13 pages).

(Continued)

*Primary Examiner* — Brian Christopher Delrue
(74) *Attorney, Agent, or Firm* — Sheppard Mullin Richter & Hampton LLP

(57) ABSTRACT

An outlet guide vane (OGV) structure for a gas turbine engine can comprise a plurality of radially extending guide vanes having inlets and outlets to allow cooling of a medium within the guide vanes.

17 Claims, 12 Drawing Sheets

(56) References Cited

U.S. PATENT DOCUMENTS

| | | | |
|---|---|---|---|
| 2010/0236215 A1* | 9/2010 | Venkataramani | F01D 9/065 60/39.093 |
| 2015/0285096 A1* | 10/2015 | Spangler | F01D 9/02 415/115 |
| 2015/0354370 A1* | 12/2015 | Szijarto | F01D 5/186 416/95 |
| 2016/0245091 A1* | 8/2016 | Kupratis | F01D 17/162 |
| 2017/0002685 A1* | 1/2017 | Todorovic | F01D 9/02 |
| 2017/0030199 A1* | 2/2017 | Barker | F01D 5/187 |
| 2017/0159489 A1* | 6/2017 | Sennoun | F28D 7/1676 |
| 2017/0370228 A1* | 12/2017 | Xu | F01D 5/147 |
| 2018/0066537 A1* | 3/2018 | Radomski | F01D 9/041 |
| 2018/0094583 A1* | 4/2018 | Carretero Benignos | F28D 7/005 |
| 2018/0258779 A1* | 9/2018 | Boutaleb | F01D 25/12 |
| 2018/0306042 A1* | 10/2018 | Zaccardi | F01D 25/12 |
| 2019/0014687 A1* | 1/2019 | Snyder | H05K 7/209 |
| 2019/0078452 A1* | 3/2019 | Zaccardi | F28F 3/025 |
| 2019/0120066 A1* | 4/2019 | Buchal | F01D 11/10 |
| 2019/0145264 A1* | 5/2019 | Jonnalagadda | F01D 9/041 415/115 |
| 2019/0186293 A1* | 6/2019 | Boutaleb | F01D 9/041 |
| 2019/0249558 A1* | 8/2019 | Zaccardi | F02C 7/14 |
| 2019/0338661 A1* | 11/2019 | Zaccardi | F01D 25/162 |
| 2020/0165978 A1* | 5/2020 | Saddawi | F01D 5/145 |
| 2020/0182086 A1* | 6/2020 | Marquie | F01D 25/12 |
| 2020/0362728 A1* | 11/2020 | Davies | F01D 25/12 |
| 2023/0212957 A1* | 7/2023 | Zheng | F01D 9/041 415/119 |
| 2024/0018905 A1* | 1/2024 | Decarne-Carnavalet et al. | F02C 7/18 |

FOREIGN PATENT DOCUMENTS

| | | |
|---|---|---|
| EP | 0469827 A1 | 2/1992 |
| EP | 2977548 A1 | 1/2016 |
| FR | 2989108 A1 | 10/2013 |
| WO | 2005040559 A1 | 5/2005 |
| WO | 2015065659 A1 | 5/2015 |

OTHER PUBLICATIONS

Combined Search and Examination Report under Sections 17 and 18(3) mailed Jun. 22, 2020 for application No. GB 2001110.2 (6 pages).

* cited by examiner

OUTLET GUIDE VANE COOLER

CROSS-REFERENCE TO RELATED APPLICATIONS

This application is a national stage of, and claims priority to, Patent Cooperation Treaty Application No. PCT/EP2021/051870, filed on Jan. 27, 2021, which application claims priority to Great Britain Application No. GB 2001110.2, filed on Jan. 27, 2020, which applications are hereby incorporated herein by reference in their entireties.

BACKGROUND

Geared turbo fan engines are capable of offering higher propulsive efficiencies when compared to conventional gas turbine engines. This is achieved by providing a gearbox which is located between the fan (at the front of the engine) and the drive shaft of the engine (which is itself driven by the turbine at the rear of the engine). Rotation of the drive shaft causes rotation of the gearbox which in turn causes rotation of the fan.

Depending on the gearbox being used the gear ratio can be selected to match the optimal rotational speed of the engine and/or to maximise the rotational speed of the fan. For example, epicyclic gearboxes provide extremely high gear ratios within a compact housing and are commonly used in geared turbo fan designs.

Operating a gearbox that is coupled to the drive shaft of a gas turbine engine can lead to extremely high rotational speeds and consequential heat generation. Even though epicyclic gearboxes can be highly efficient (in the order of 99.5% efficiency) the energy loss is dissipated as heat.

In order to cool the gearboxes, conventional arrangements use cold air in the bypass channel of the engine to cool the gearbox and remove and control the heat. This allows a gearbox to be conveniently cooled using the cold air in the bypass channel. An oil passage from the gearbox to a heat exchanger located proximate to the outer bypass channel of the engine is used to exchange heat from the oil in the gearbox to the cold air passing through the bypass channel. The gearbox can thereby be cooled.

Although such an arrangement increases the weight and complexity of the bypass channel, it advantageously allows for the convenient cooling of the gearbox using the cold abundant air that passes at high speed through the bypass channel of the engine. Such conventional arrangements have sufficient cooling capability to cool even larger and higher ratio gearboxes. However, locating cooling channels within the bypass channel exposes the channels to collision from any debris or ice entrained in the high speed airflow. The channels therefore need to be sufficiently strong and rigid to resist any impact damage. Increasing the strength requires a more substantial channel which can then compromise the heat transfer properties of the channel.

SUMMARY

The present disclosure describes an alternative cooling arrangement for the bypass channel of an engine using outlet guide vanes to dissipate heat whilst simultaneously addressing the problem with impact damage. The arrangement allows for the cooling of a gearbox, such as an epicyclic gearbox, in a more compact and efficient manner with fewer components and complexity. The arrangement also allows for a weight saving in respect of the cooling system for the gearbox which advantageously also reduces the overall weight of the engine.

Thus, an improved cooling arrangement for a gas turbine engine and in particular, but not exclusively, for a geared turbofan engine, is provided. The cooling arrangement can create new surfaces available for heat transfer whilst resistant to damage during flight.

Viewed from a first aspect there is provided an outlet guide vane (OGV) structure for a gas turbine engine, the structure comprising a plurality of radially extending guide vanes, wherein at least one guide vane comprises at least one inlet allowing air to pass into at least one internal cavity within the guide vane and at least one outlet allowing air to exit the at least one internal cavity, wherein the inlet is arranged upstream of an outlet in a direction, in use, of airflow over the guide vane.

Thus, there is provided an arrangement wherein an internal cavity to an outlet guide vane is provided so as to contain one or more cooling channels or conduits. Air passing through a guide vane structure may advantageously be allowed to pass through the cavity of one or more vanes and cause heat transfer from conduits contained within the respective vane. Air flows into the or each cavity and out of the cavity as it passes through the outlet guide vane structure.

Each guide vane of the structure may comprise a pressure surface defining one side of the vane and an opposing suction surface defining an opposing side of the vane. The cavity may then be conveniently located between the two opposing sides of the vane. In effect the two surfaces provide a protective casing for the cavity and also a heat transfer surface against which air can flow as it passes through the engine.

Advantageously the inlet of each vane may be arranged so as to extend through the pressure surface of the vane. Specifically, the inlet is located on a portion of the pressure surface which is not in line with the axis of airflow through the engine when the engine is operating. By locating the inlet behind the leading edge of the vane and on the pressure surface the inlet is shielded or protected from debris of foreign objects that may be travelling along the axis of the engine. In order to enter the inlet any such objects would need to turn or change direction significantly which makes entering the inlet unlikely owing to the speed and direction of such objects along the axis of the engine (being entrained in the airflow)

There may be a single inlet or a plurality of individual inlets extending along the vane, for example in a radial direction away from the hub of the OGV structure. The one or more inlets may be arranged in the first 50% of the chord length of the vane measured from the leading edge to the trailing edge of the vane. Similarly, the at least one outlet may be arranged in the second 50% of the chord length of the vane measured from the leading edge to the trailing edge of the vane. Such a configuration provides a flow path from an upstream inlet to a downstream outlet when measured along the chord length of the vane. Air may then flow into the vane cavity or cavities through the inlet(s) and out of the cavity or cavities through the outlet(s) to provide a heat transfer path.

Advantageously, the at least one inlet may be arranged in the first 25% of the chord length of the vane measured from the leading edge to the trailing edge of the vane. Allowing air to enter the vane cavity or cavities towards the leading edge (in the first 25% of the chord length) maximises the volume within the cavity which receives the inlet air and additionally minimises the risk of foreign objects entering the inlet. This is because of the aerofoil shape of the vane with the leading edge comprising a curved surface for turning the impinging air. The curved surface minimises the risk of an object travelling along the axis of the engine turning into the inlet.

More specifically, the structure may advantageously comprise a primary axis corresponding to the axis of air entering the engine during use (this is the direction along which air travels into the engine and which is likely to entrain foreign objects or debris). A portion of the leading edge of the suction surface of the at least one guide vane extends in a direction substantially perpendicular to the primary axis to overlap the pressure surface of the vane such that the pressure surface of the vane is not visible when viewed along the primary axis of the structure. In operation the airflows into engine are not perfectly straight or linear. More specifically, the airflow entering the engine is not entirely stationary. Crosswind, take-off rotation etc. are events during operation where there may be slight differences between the main rotor axis and the air flow entering the engine. However, they are generally or roughly the same. The relation between the cavity inlet and engine main rotor axis is slightly more fixed. The intended meaning of the arrangement described herein is that air entering the engine in use is not generally able to pass directly into the guide vane cavity because of the spacing described above.

In effect the suction surface of the vane curves around the leading edge of the vane and then intersects with the pressure of the vane which is defined as the opposing side of the vane to the suction side. The suction surface defines the leading edge of the vane which conceals or covers the pressure surface when the vane is viewed along the primary axis of the engine. Thus, the first portion of the pressure surface measured along the chord length of the pressure surface is not visible since it is concealed behind the suction surface. More specifically, the inlet(s) must be offset with respect to a line extending parallel with the axis of airflow into the engine and which touches the leading edge of the vane at its outermost point (where the suction and pressure surfaces converge or merge together).

Another way of describing the arrangement is that normally it is not possible to see the pressure side of the fan outlet guide vanes when viewing the engine inlet from a distance due to the vane curvature.

The position of the inlet may be selected according to the predicted airflow characteristics of the engine to prevent the inlet to the vane cavity or cavities ingesting objects or debris. Thus, a leading edge of the at least one inlet may be spaced by a predetermined distance from the most distal edge of the suction surface leading edge measured in a direction perpendicular to the primary axis of the structure.

The inner space of each vane may be arranged as a single volume or cavity or may be subdivided into one or more cavities, for example to incorporate internal structural components or members.

So as to effect heat transfer within the cavity a cooling medium is caused to flow within an independent conduit or conduits passing within the vane cavity. Thus, the internal cavity may comprise at least one conduit arranged in use to communicate a fluid through the cavity. The fluid may be any suitable fluid which can allow for heat transfer from the fluid, through the conduit and to the airflow passing through the cavity of the vane. This thereby allows for heat transfer from the fluid to the air. In effect, the pipes/conduits within the vanes act to communicate coolant (in the form of a fluid or the like) through the inner cavity of the vanes to cause cooling The conduits may be arranged in any suitable path or arrangement within the vane. For example, the cavity may comprise:

(a) a plurality of conduits each extending radially through the vane and each being spaced along the length of the guide vane measured along the chord of the guide vane; and/or (b) a plurality of conduits each extending along the length of the guide vane measured along a part of the chord of the vane and each being spaced radially through the vane.

In the arrangement (a) the conduits are each extending away from the hub of the OGV structure and dissipate heat as the air impinges on the side surface of each conduit. In the arrangement (b) the conduits each extend along a portion of the chord length of the vane (i.e., generally along the direction of airflow within the cavity) and dissipate heat as the air travels along the side surfaces of the conduit.

In order to provide a flow path for coolant within the conduits to the gearbox or motor of the aircraft the conduits may be arranged to extend from and to a portion of the vane proximate to a central hub portion of the OGV structure to which each vane is attached. The coolant can then be communicated to the hub portion of the OGV structure and pass radially outwards and into each of the vanes. Coolant can then be returned and a corresponding flow path provided through the engine to the component which is to be cooled by the arrangement described herein.

In another arrangement the conduits may be arranged to extend from the outer periphery of the OGV structure radially inwards towards the central axis of the engine i.e. the conduits may be arranged to extend within a vane from and back to the outer periphery of the OGV. This provides the advantage that in service it is possible to replace one OGV without stripping down a large portion of the engine.

In such an arrangement, in order to communicate the coolant which passes into and out of the vanes to the gearbox (or heat exchanger) the conduits may be arranged to pass through a portion of the pylon that physically connects the engine to the aircraft wing. The pylon contains an internal space that may allow for the passage of a conduit from the outer periphery of the vanes to the gearbox and back. Thus, the gearbox can be cooled by the outlet guide vanes and each guide vane cooling arrangement may be conveniently accessible from outside of the engine The conduits within each vane may be arranged in a variety of positions within the vane cavity. In one arrangement the conduits may be in contact with the inner surfaces of the pressure surface and/or the suction surface of the guide vane within the cavity. Advantageously by locating some or all of the conduits in direct contact with the pressure and/or suction surface walls conduction can allow for efficient heat transfer. The outer airflow facing surfaces of the pressure and suction surfaces will become cooled to, or close to, ambient air temperature, which at higher altitude is significantly cooler than typical oil circuit temperatures for gas turbines as high velocity air passes over their respective surfaces. Arranging the conduits along the inner surfaces of the vane allows these outer surfaces to function as effective heat sinks to remove heat from the coolant or fluid within the conduit.

In an alternative arrangement the conduits may be arranged so as to extend across and through each cavity such that the outer surfaces of each conduits are exposed to airflow within the cavity. Here, heat is dissipated into the airflow within the cavity.

Each conduit may be arranged in any suitable path within each vane. For example, the conduit may have a fluid inlet and a fluid outlet and the conduit may alternate in a radial direction along the chord direction of the guide vane i.e. the conduit may flow backwards and forwards from and towards the hub whilst extending along the chord length of the vane, in effect in a serpentine configuration within the vane. Heat can then be dissipated all across the volume within the vane (or against the pressure and suction surfaces)

In an arrangement where a vane comprises a plurality of conduits a manifold may be provided to allow for efficient flow of fluid or coolant from a central conduit connected to the gearbox (for example) to the plurality of conduits within the vane. For example, the or each vane may comprise a plurality of conduits extending radially within the vane and a manifold located at each radial end of the plurality of conduits allowing for fluid communication between adjacent conduits. In such an arrangement a manifold may be arranged at either radial end of the vane to distribute coolant to the individual conduits and then combine the flows to return the cooled fluid to the gearbox.

The cross-sectional area of the inlets may be less than the cross-sectional area of the cavity at a position between the inlet and outlet measured along the chord length of the guide vane. The natural shape of a guide vane allows for profile being thinner closer to leading and trailing edge.

The position, size and profile of the inlets may be adapted according to the operating conditions and airflow within the engine. For example, a plurality of inlets may be provided proximate to the leading edge of the pressure surface of the guide vane. The inlets may also be spaced radially along the length of the guide vane. Thus, a number of discrete inlets may be arranged extending radially along each vane. This advantageously allows the structural integrity of the vane to be improved and additionally allows air to be communicated into different cavities within the vane if multiple cavities are included.

Similarly, a plurality of outlets may be provided proximate to the trailing edge of guide vane and spaced radially along the length of the guide vane. An inlet may then be in fluid communication (for airflow) with a corresponding outlet. A combination of several cavities may be used within a vane with each cavity having an independent inlet and outlet.

Advantageously, and with reference to FIGS. 17A and 17B, the dimension of the inlets measured along a chord direction may be less than the dimension of the inlets measured in a radial direction i.e. $L_{radial} > L_{chord}$. In effect the inlets are longer measured in a radial direction than they are in the chord wise direction. This improves the efficiency of airflow and minimises turbulence. By way of comparator FIG. 17B shows the opposite configuration with a less optimal arrangement.

It will be recognised that the present disclosure is relevant to the cooling of a geared turbofan engine and an aspect of this disclosure extends to such an engine. However, additionally and/or alternatively, such an arrangement may be used to cool other components of an engine including, for example, an electric motor, oil bearings or the like. Such an electric motor may be used for propulsion.

Viewed from another aspect there is described herein a method of cooling a reduction gearbox of a geared turbo-fan engine, wherein coolant is caused to be communicated to a cooling arrangement comprising an outlet guide vane structure as described herein.

Viewed from yet another there is described herein a method of cooling one or more electrical motors of a fan propulsion arrangement wherein coolant is caused to be communicated to a cooling arrangement comprising an outlet guide vane structure as described herein.

Coolant flow to the individual vanes may be selectively controllable by means of a suitable valve arrangement. Thus, the vanes and the amount of cooling can be selectively activated to effect cooling. For example, on engine start-up it may be desirable to deactivate all or some of the cooling to allow oil temperatures or the like to reach an operational temperature. The cooling arrangement described herein may then be activated and controlled to control the temperature levels as required for operational performance.

The cooling arrangement described herein provides a number of advantages including:

1. Part count is reduced. The components conventionally needed to cool the gearbox in a geared turbofan engine can be reduced including reducing the pipework that is needed to communicate fluid out to the bypass channel and back.
2. Compact solution. The arrangement takes full advantage of the OGVs wetted surface area (surface against which air flows) to achieve the heat exchanging effect.
3. Added functionality. The OGV is provided with an integrated heat exchanging function.
4. Reduced Oil Frothing. The compact arrangement reduces the potential for air and oil to mix together creating a 'froth' within the gearbox.
5. Reduced Oil Volume. The reduction in size of the arrangement allows for a reduction in the oil volume needed to cool the gearbox.

The cooling arrangement described herein may additionally be adapted to be in fluid communication with heat exchangers in or around the bypass channel of the engine. Fluid carrying channels proximate to the airflow within the bypass channel may conveniently radiate heat from a cooling fluid to the high speed airflow in the bypass channel. By fluidly connecting the front centre body heat exchanger described herein with such a bypass channel arrangement additional cooling may be selectively operated in extreme temperatures. This augments the arrangement described herein to provide a high capacity cooling arrangement.

The present disclosure may extend to a gearbox control arrangement in which fluid controlling valves are operable to effect cooling in response to temperatures sensors within the gearbox or within the gearbox fluid.

BRIEF DESCRIPTION OF THE DRAWINGS

One or more embodiments will now be described, by way of example only, and with reference to the following figures in which:

FIG. 12B is a cross-section showing profiles of the inlet and outlet ports;

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The invention is further described with reference to the examples described herein. It will be appreciated that the invention as claimed is not intended to be limited in any way by these examples. It will also be recognised that the invention covers not only individual embodiments but also combination of the embodiments described herein.

DETAILED DESCRIPTION

Figure 1:
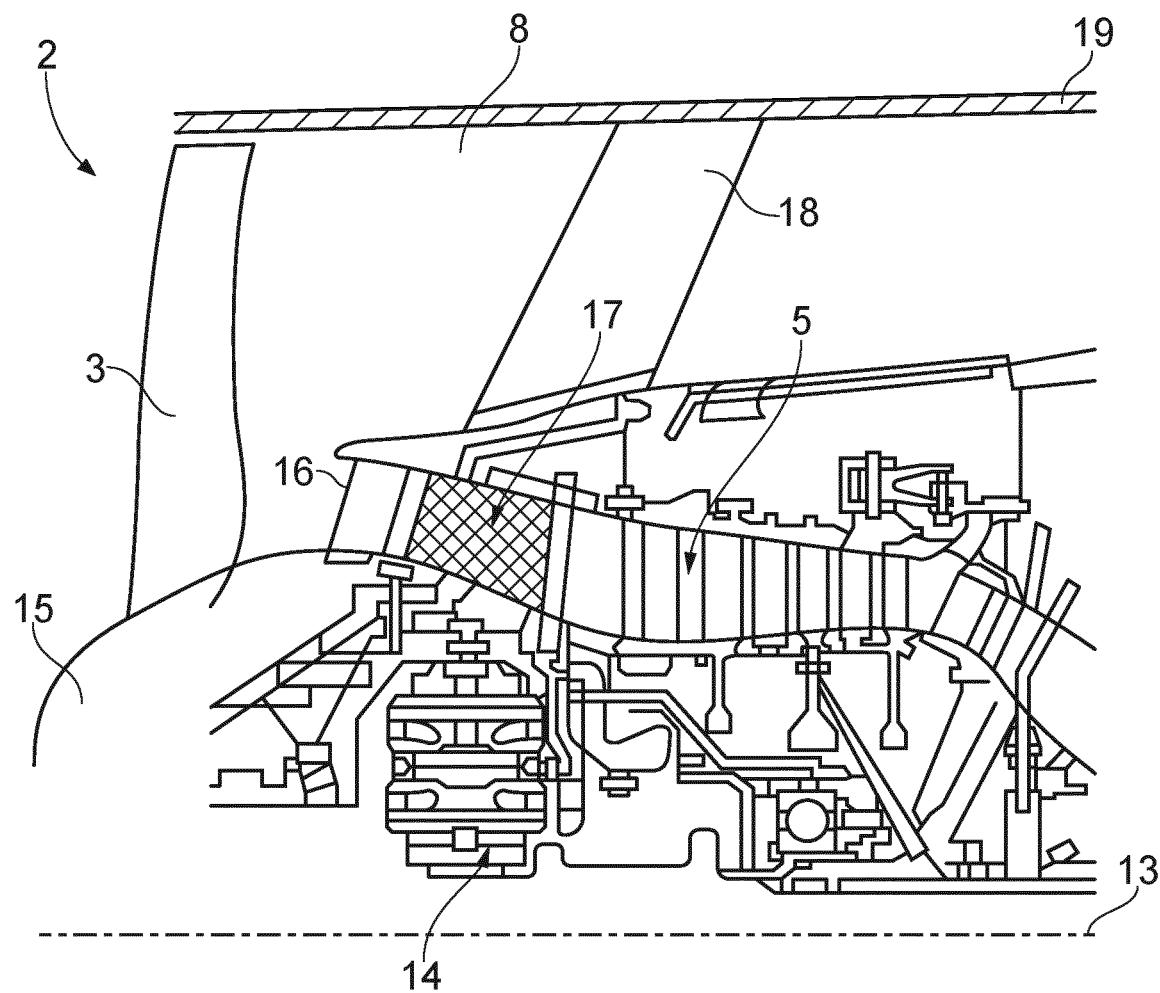
FIG. 1 shows a cross-section of a geared turbo fan engine.

FIG. 1 shows a cross section through a geared turbo fan engine 2. The operation of a geared turbo fan engine will be understood by a person skilled in the art of engine design. However, for clarity, in the present application the engine 2 comprises a central core 15 centred about a central axis 13 of the engine 2. The engine core comprises a forward facing portion which rotates and supports radially extending fan blades 3. The fan blades extend from the core into the bypass channel 8 which surrounds the core 15.

The fan blades are rotatably mounted with respect to the core through a planetary gearbox 14 (also known as an epicyclic gearbox). The planetary gearbox receives a rotational input from the central shaft of the engine and has a predetermined gear ratio to control the rotational speed of the fan blades 3. The engine comprises an inlet duct 16 through which air is communicated past the guide vanes 17 to the compressor 5 and on the combustion chambers (not shown) downstream of the inlet duct 16.

The combustion process drives a turbine (not shown) which in turn drives the central shaft (arranged along axis 13) which in turn drives the input to the planetary gearbox 14. Because of the high rotation speed of the central shaft heat is generated in the planetary gearbox. Conventionally this heat is dissipated through an oil cooling system that circulates oil from the gearbox to a heat exchanger located within the nacelle of the engine. The circulating oil thereby cools the gearbox allowing for continued operation.

A modified outlet guide vanes 18 arrangement is described herein.

The outlet guide vanes 18 enter from the outer surface of the core 15 and across the bypass channel 8 to the bypass channel wall 19. Channel wall 19 is often divided into pieces sometimes denoted as fan case, aft fan case and similar terms in the art. The outlet guide vanes extend around the perimeter of the core as shown in FIGS. 2A and 2B.

Figure 2A:
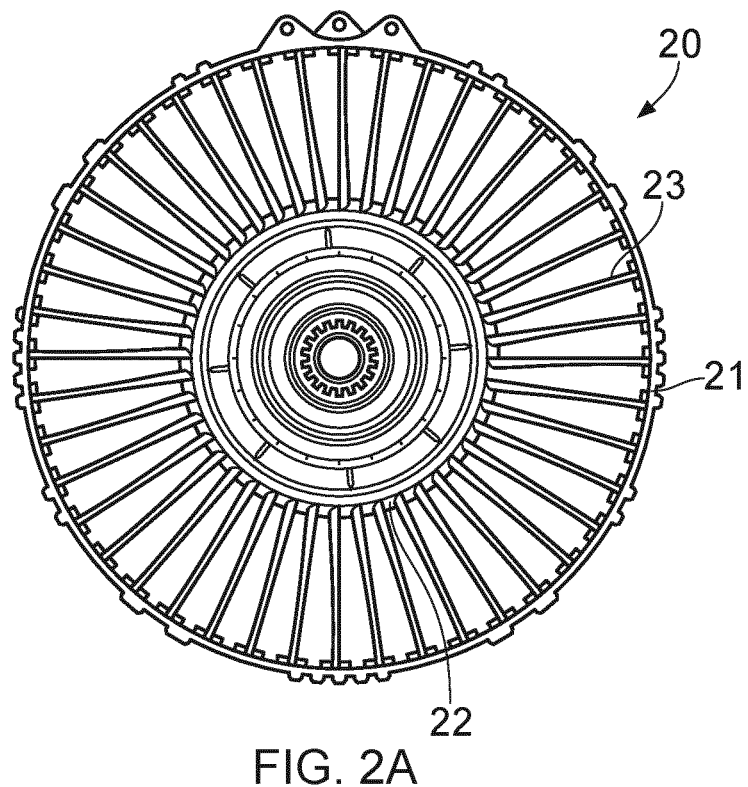
FIGS. 2A and 2B show an end view of an outlet guide vane structure viewed along a primary axis corresponding to the axis of air entering the engine during use.

FIG. 2A shows a forward looking aft view of the entire outlet guide vane (OGV) assembly 20. The assembly 20 comprises an outer ring 21, which is generally a sub part of the bypass channel wall 19 shown in FIG. 1, which connects to the outer body of the bypass channel 8 shown in FIG. 1. The assembly 20 also comprises an inner frame structure (or hub) 22 which connects to bearings and supports within the core and defines a central portion through which the central shaft can pass. The assembly forms a structural part of the engine.

Between the outer ring 21 and inner frame structure 22 the OGV assembly 20 comprises a plurality of individual guide vanes 23 structurally connecting the outer ring 21 and inner frame structure 22. The individual vanes are arranged to control the direction of flow of air within the bypass channel. More specifically the vanes are provided with a specific profile which is arranged to turn the air leaving the fan blades 3 (shown in FIG. 1) so as to leave the rear of the engine in a direction generally parallel to the axis 13 of the engine. This maximises the thrust generated by the engine by ensuring the air leaving the bypass channel is in a rearward or aft direction. Some variation to the vane profiles can be used around the circumference to improve the airflow around structures allowing for engine core pipework and under wing mounting structures located in the bypass channel. The vane profile is thereby not necessarily the same for all outlet guide vanes 23.

Figure 2B:
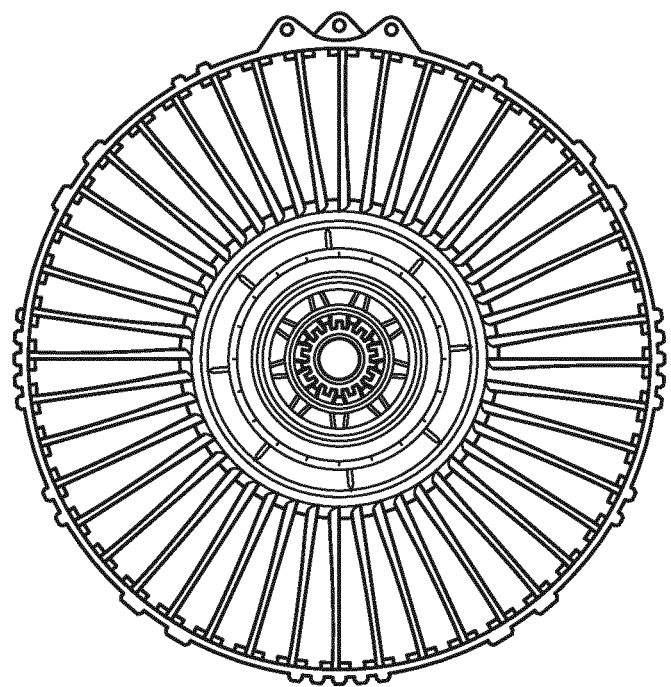
Figure 3:
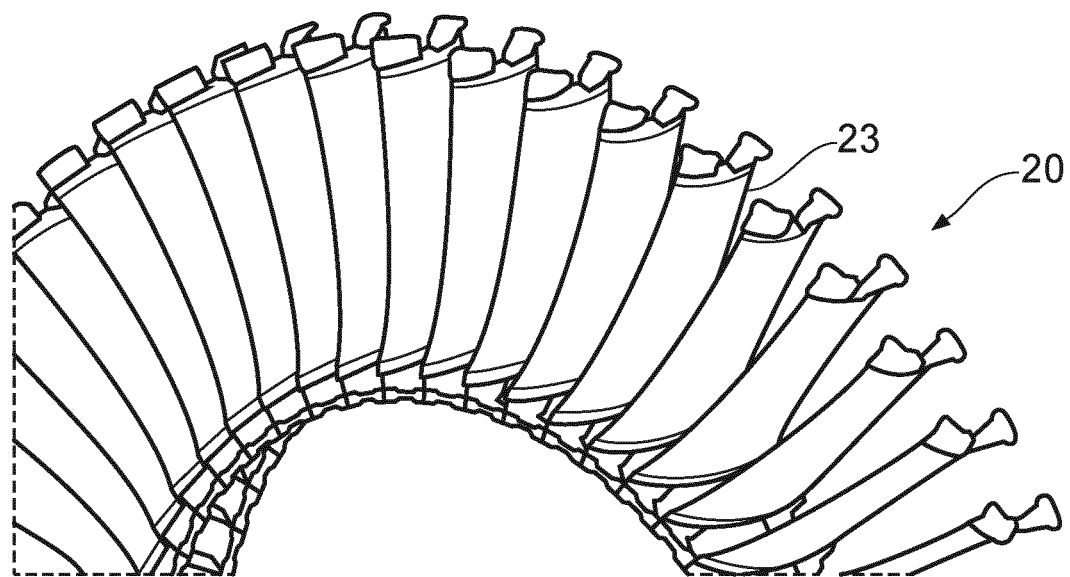
FIG. 3 shows another view of the outlet guide vane structure of FIGS. 2a and 2b.

FIG. 3 shows the OGV assembly without the outer ring which is shown in FIGS. 2a and 2b. The individual OGVs 23 are illustrated. In this arrangement the individual vanes are equally spaced apart to each divide and turn the air passing through the assembly. The illustration shows some of the forty-eight guide vanes in the assembly as illustrated in FIGS. 2A and 2B, but depending on engine size and architecture a different number of vanes can be used. Another option is to have some OGVs with a first chord length and at least one additional vane configuration, having a second chord length, placed between two vanes having the first chord length. The arrangement of vanes depends on the specific engine design.

Figure 4:
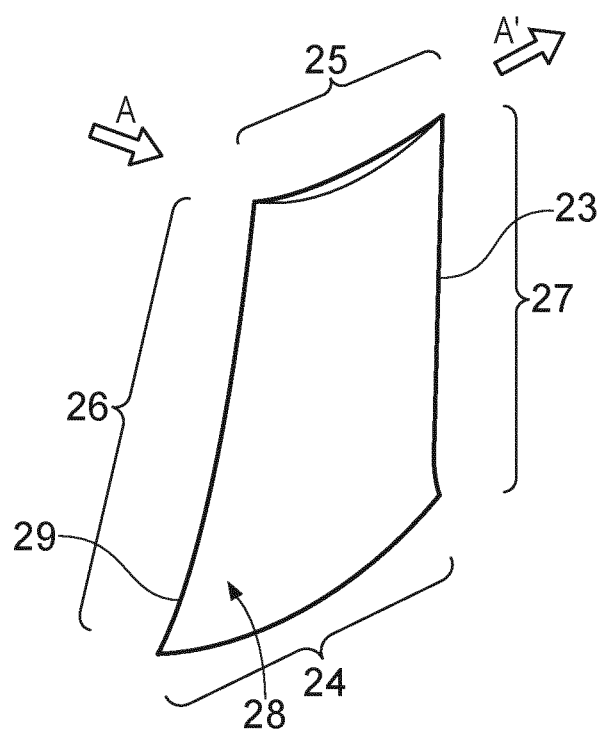
FIG. 4 a single guide vane from the structure shown in FIGS. 2 and 3.

FIG. 4 shows a single outlet guide vane 23 from FIG. 3, illustrated without attachment features.

The vane 23 has a proximal end or root 24 for connection to the inner ring or hub of the assembly 20. The vane 23 has a corresponding and opposing outer end 25 for connection to the outer ring of the assembly 20. Each vane 23 also has an forward facing leading (or upstream/fore) edge 26 which faces the front of the direction of travel of the aircraft and a rearward facing trailing (or downstream/aft) edge 27 which faces the exhaust of the engine.

As shown in FIG. 4 the vane has a profile which curves from the leading edge 26 to the trailing edge 27. The curve (as shown) is more pronounced at the leading edge to effect the turning of air as it impinges on the sides of the vane. The sides of the vanes are in the form of a pressure side 29 and a suction side 28.

When the aircraft is moving through the air, air approaches the engine, is pressurised by the fan and enters into a swirl or circulating motion. The swirling and pressurized air then impinges on the leading edge of the vane 23. Air then travels along the pressure side 29 and along the opposing suction side 28 of the vane and leaves the vane from the trailing edge 23 in a different direction than the direction of impingement on the vane. This is illustrated by arrows A and A'.

FIG. 4 represents a conventional configuration of outlet guide vane for a gas turbine engine including a geared gas turbine engine. In such a conventional arrangement the aerodynamic and thermal function of the guide vanes is only to control the flow direction of air through the bypass channel to increase thrust.

The present disclosure includes an augmented outlet guide vane assembly that not only provides the conventional function of air direction control but additionally provides a cooling arrangement for a gearbox of the engine as described above.

Furthermore, the augmented OGV arrangement described herein provides a highly efficient heat transfer arrangement which conveniently does not allow foreign objects in the bypass airflow to cause damage to the cooling arrangement.

The augmented OGV arrangement will be described with reference to FIGS. 5 to 12.

Figure 5:
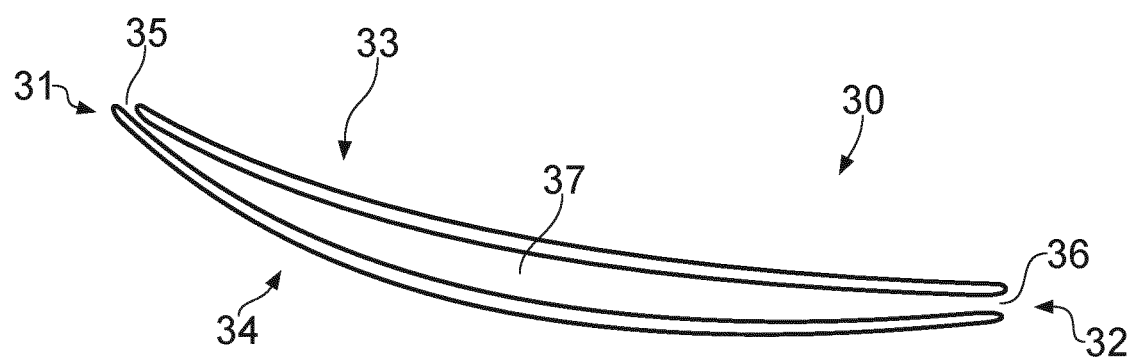
FIG. 5 shows a cross-section through a guide vane of FIG. 4.

FIG. 5 shows a cross-section through an augmented outlet guide vane according to the present disclosure.

The modified guide vane 30 comprises a leading edge 31 and a trailing edge 32. In use, air travels from the leading edge, along the side surfaces of the vane, to the trailing edge. The modified vane 30 comprises a pressure surface or side 33 and an opposing suction side or surface 34. The pressure side of the vane is the side against which the air impinges as it flows through the engine and contacts the vane.

However, unlike the conventional vane shown for example in FIG. 4, the modified vane 30 comprises an inlet aperture 35 proximate to the leading edge 31 and an opposing outlet aperture 36 proximate to the trailing edge 32. The inlet 35 and outlet 36 provide a flow path 37 within the vane 30. In effect air may flow not only along the outer surfaces of the vane 30 but additionally within the vane and along the cavity 37 defined between the pressure and suction surfaces of the vane.

In use air approaches the modified vane 30 and is caused to change direction from the leading edge to the trailing edge. Additionally air is able to enter the vane and pass through one or more cavities within the vane (defined between the pressure and suction surfaces) and to the outlet at the trailing edge of the vane.

Figure 6:
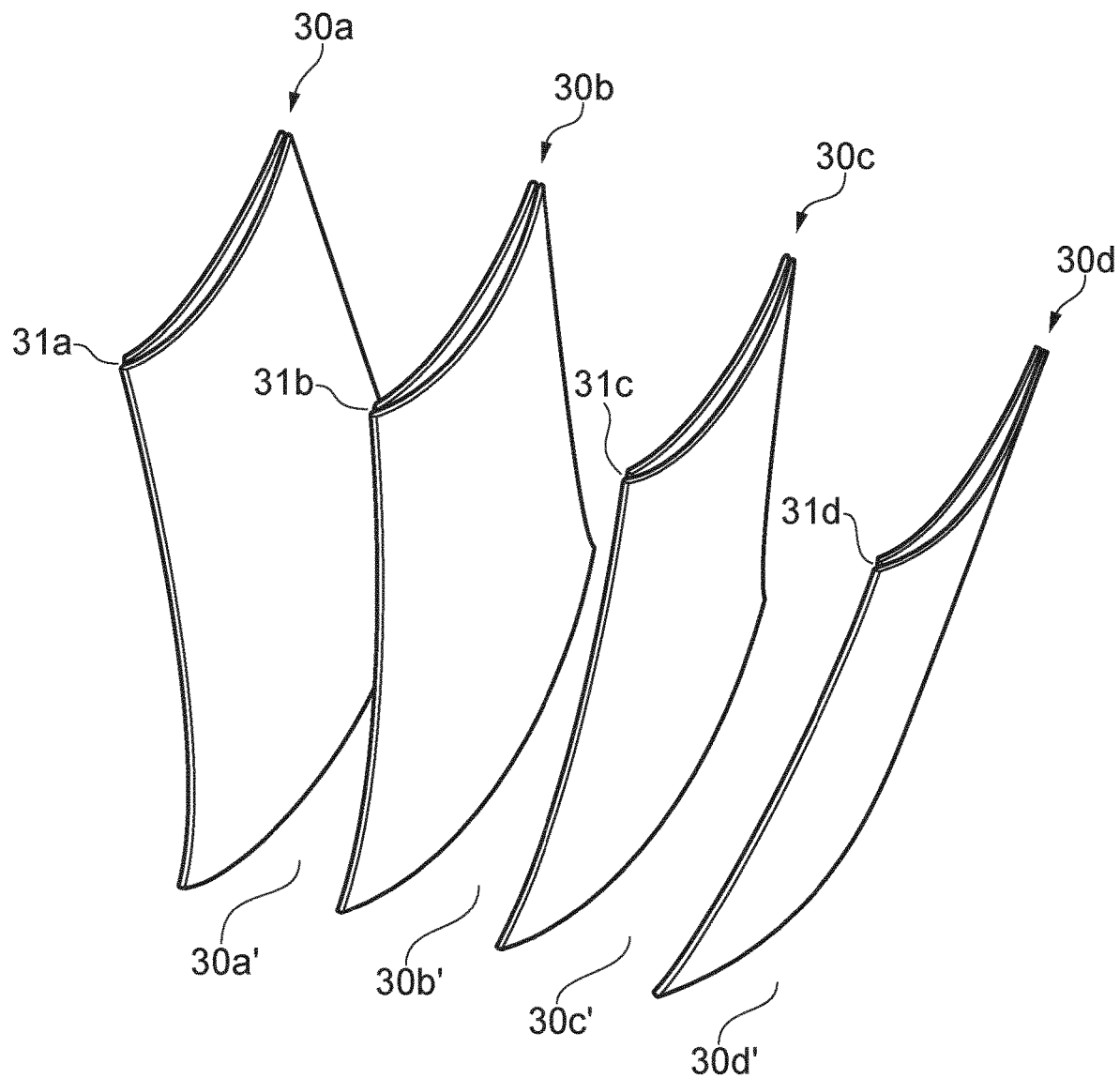
FIG. 6 shows a series of adjacent guide vanes of FIG. 5.

FIG. 6 shows a plurality of adjacent modified vanes 30a, 30b, 30c and 30d. Each adjacent vane defines a space 30a', 30b', 30c' and 30d' therebetween, through which air in the bypass channel may flow. Additionally each vane provides an internal passage 31a, 31b, 31c and 31d through which air may flow.

It is the internal passages 31a, 31b, 31c and 31d of the modified vanes 30a-30d which allow for an efficient and effective cooling zone within each of the vanes.

Figure 7:
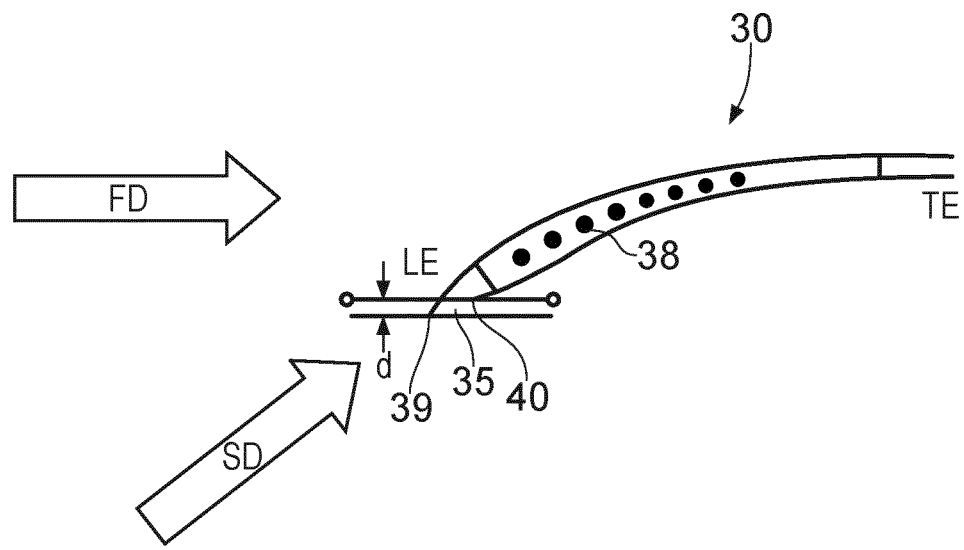
FIG. 7 shows further details of the modified guide vane structure described herein.

FIG. 7 shows a cross-section through a modified vane 30. As shown, the modified vane 30 comprises a leading edge LE and a trailing edge TE. Arrow FD indicates the axis of flight of the aircraft and represents the direction along which foreign objects, unaffected by the fan, will travel with that airflow. Arrow SD indicates the axis of flow of swirl air leaving the fan blades and travelling along the bypass channel. Swirl is caused by the interaction of the incoming air with the fan blades which are rotating at high speed to drive air along the bypass channel and out of the engine.

Foreign objects travelling into the engine may impact with guide vanes or other support vanes which extend across the bypass channel. Such damage is known in the art as FOD or foreign object damage.

FOD may be caused by a range of debris or objects in the air including runway debris, sand, ice or even birds.

The vanes may be additionally utilised to provide a cooling function. Specifically, the internal cavity 37 is used to house a plurality of cooling channels. The cooling channels are arranged to carry a coolant which may transfer heat from a gearbox (or the like) along a conduit to the channels within the or each vane cavity 37.

Because of the air passage that is provided through the vane according to the present disclosure, high velocity air travels through the cavity of the vane as the engine operates. The high velocity air provides a highly convenient heat sink to remove heat from the outer surfaces of channels located within the cavity 37. The cold airflow around the outer surfaces of the channels absorbs heat from the outer surfaces of the channels. This thereby provides cooling to the cooling medium contained within each channel.

FIG. 7 illustrates a plurality of coolant channels 38. In the embodiment shown in FIG. 7 a series of channels 38 are shown extending along the inner cavity 37 of the vane. The open LE of the vane allows air to enter the cavity and flow over and around the channels before leaving the TE of the vane.

Foreign objects of a severe (i.e., relatively large) type are more likely to travel in the direction of arrow FD i.e., the objects are ingested into the engine and travel along the bypass channel at high speed in a direction generally parallel with the direction of flight i.e. parallel with the axis of the engine. Conversely, airflow in the swirl direction is less likely to carry severe foreign objects. The inlet 35 of the vane cavity is configured to capture a portion of the swirl air and avoiding in flight direction FOD. This thereby minimises the risk of the vane cavity receiving foreign objects which could damage the internal channels 38. In the case of ice hailstones being the foreign objects, such hailstones will be scattered into smaller and less critical pieces if interacting with the fan causing the particles to have a swirling motion. A similar situation is true for birds being the foreign object, where mass put into a swirl motion will be less detrimental as the impact is less concentrated.

Advantageously, because the internal channels 38 are protected from FOD, as a result of the selection of airflow into the vane cavity, they can have thinner wall thicknesses which enhances the heat transfer properties of each channel and reduces the weight.

Referring again to FIG. 7, the inlet 35 to the vane cavity 37 can be seen to be located downstream of the leading edge tip 39 of the suction side of the vane and upstream of the leading edge tip 40 of the pressure side of the vane. More specifically, distance d illustrates that the suction side tip 39 is spaced from the pressure side tip 40 by distance d. This spacing or distance means that the suction side tip overlaps the pressure side tip to ensure such that foreign objects cannot enter the cavity 37 of the vane; they cannot turn the sharp corner at the leading edge to enter the internal cavity of the vane.

By providing a concealed or hidden inlet 37 (viewed from the leading edge of the vane towards the trailing edge of the vane) behind a portion of the leading edge of the suction side of the vane any debris travelling along the axis FD of the airflow will not easily enter the vane cavity. Thus, the internal coolant channels located within the cavity of the vane are thereby protected from collisions with FOD or debris travelling along the axis FD of the engine.

Conversely, swirl air (as indicated by arrow SD) is less likely to carry debris or foreign objects. This air has a greater chance of entering the cavity 37 of the vane 30.

Figure 8:
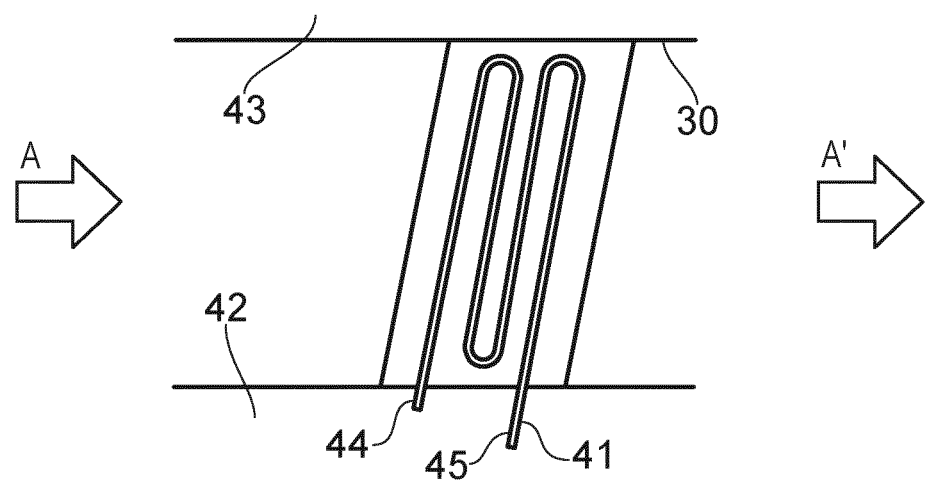
FIG. 8 shows a cross-section of the modified guide vane including the internal cooling channels.

FIG. 8 shows an example embodiment of a coolant channel within a modified guide vane described herein. The example shown in FIG. 8 comprises an alternating or serpentine path alternating in the direction of a cooling channel 41.

The cooling path 41 extends from and returns to the hub 42 forming the central portion of the outlet guide vane assembly structure to which each of the plurality of vanes is attached. The vane 30 extends from the hub 42 to the outer ring 43 defining the outer ring of the outlet guide vane structure. In use a coolant, such as an oil, is communicated into the cooling channel 42 through the cooling circuit inlet 44, through the conduit, to the outlet 45. The inlet 44 and outlet 45 are in fluid communication with the gearbox (in one example) of the geared turbofan engine.

In an alternative arrangement, the conduits within the vanes may extend radially inwards i.e. in the opposite configuration shown in FIG. 8. By extending the cooling conduits from and back to the outer periphery of the OGV structure it is possible to allow for easier maintenance of the cooling arrangements since there is easier access from the outside of the engine. The coolant may be collected, for example, with a peripheral manifold and communicated to the gearbox (or heat exchanger associated with the gearbox) through the engine pylon which connects the engine to the wing.

Such an alternative arrangement may be used in engine designs where space is limited towards the engine core and/or where maintenance access is limited. The inner position is less accessible and it can be challenging to route an oil circuit to the inner part of the vane. Furthermore, oil pumps etc., can be conveniently located on the fan case allowing for easier access and connection to the radially outer position of the OGV. In yet another arrangement one inlet may be provided in a first end of the OGV and an outlet in the second end.

Heat transfer occurs as the cold air flows through the guide vane structure around each vane and, importantly, through the cavity in the modified vanes (indicated by arrows A and A'). Heat is dissipated from the gearbox to the heat transfer arrangement proximate to the gearbox (for example a local heat exchanger) and then communicated to the modified outlet guide vane structure. The oil is caused (for example by means of one or more pumps) to flow through the conduit 41 in one or more modified vanes. As the air passes through the guide vane cavities (and over the outer surfaces) it collects heat from the walls of the conduits within the vane reducing the temperature of the coolant contained within the conduit. Cooling of the coolant is thereby achieved as heat is dissipated to air passing through the OGV structure. Coolant can then be returned to the gearbox to collect more unwanted heat.

Advantageously, because of the protection provided by the modified vane the wall thickness of the coolant conduits 41 can be reduced. This not only increases the heat transfer coefficient of the conduit to the air passing there over but additionally reduces the weight of the modified vane. Combined with the reduced weight of the vane by virtue of the apertures at the leading and trailing edges of each vane the overall weight increase of the modified OGV structure can be minimised.

Any suitable material may be used for the conduits 41 within each vane. For example, aluminium or aluminium alloys may be used which benefit from good thermal conductivity and specific strength and are relatively low in weight. In another arrangement different materials may be used for the interior oil circuit having a higher thermal conductivity, such as copper. A second material may be used for the exterior vane surfaces with higher specific stiffness or strength, such as titanium or carbon fibre reinforced plastic. It will be recognised that different material combinations may be used based on the local required thermal performance and structural strength. The strength may be based all or in part on the likelihood of debris collision.

Similarly, the internal arrangement of the conduits 41 within the modified vanes may be selected to optimise the heat dissipation and/or aerodynamic performance of the vanes in terms of minimising pressure losses through the vane (or the effect of the modified vane on airflow).

Figure 9:
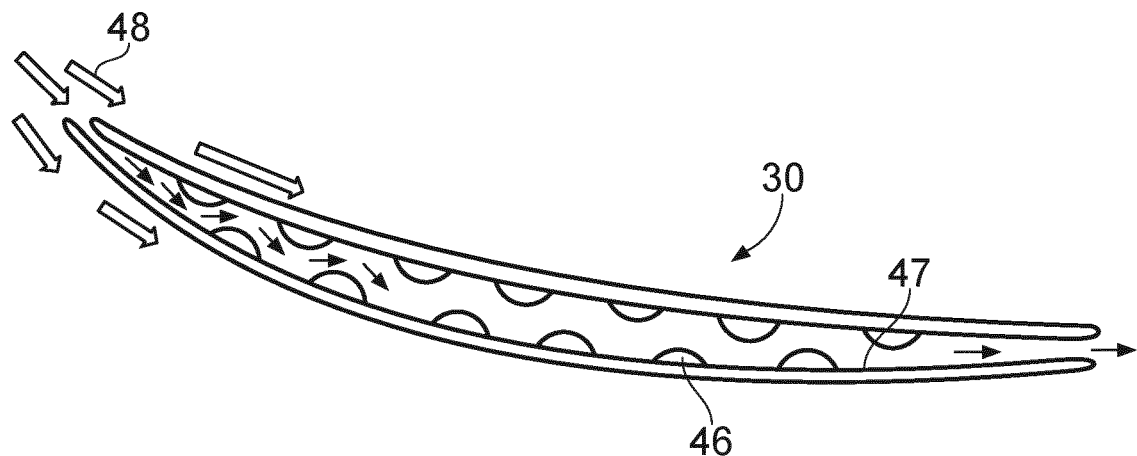
FIG. 9 shows an embodiment of cooling channel within a modified guide vane.

For example, FIG. 9 shows a modified vane in which the conduits 41 are in the form of channels 46 which run along the inner surfaces 47 of vane. Airflow, as illustrated by arrows 48 can flow through the internal cavity and dissipate heat from the channel surfaces facing the inside of the vane and the opposing side of the channel facing the outer surface of the vane can similarly dissipate heat out of the channels.

Figure 10:
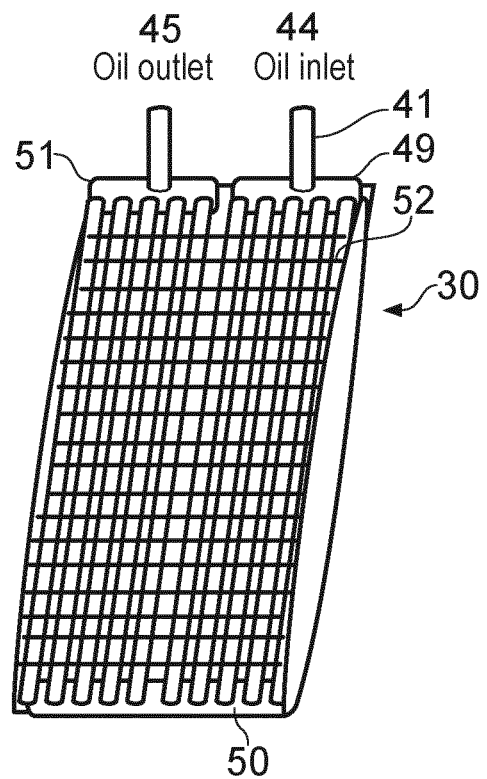
FIG. 10 shows a manifold and cooling channel arrangement of an embodiment of a modified guide vane.

FIG. 10 shows an alternative configuration of the cooling conduits 41 within the modified vane 30. In this example the inlet 44 is in fluid communication with a first manifold 49 which communicates coolant along a plurality of conduits towards an opposing end manifold 50 which collects the coolant and returns the coolant by means of a second group of conduits to a second manifold 51 which communicates coolant out of the modified vane through the outlet 45. This allows the flow of coolant to enter and exit the vane through single ports but be divided into a plurality of individual conduits thereby increasing the contact area of the conduits to the airflow within the vane. This increases heat transfer.

The individual conduits may be supported by a suitable support arrangement 52 extending across the cavity of the vane. The support arrangement 52 can also be considered as a heat sink increasing the heat transfer to the cavity air flow.

Figure 11A:
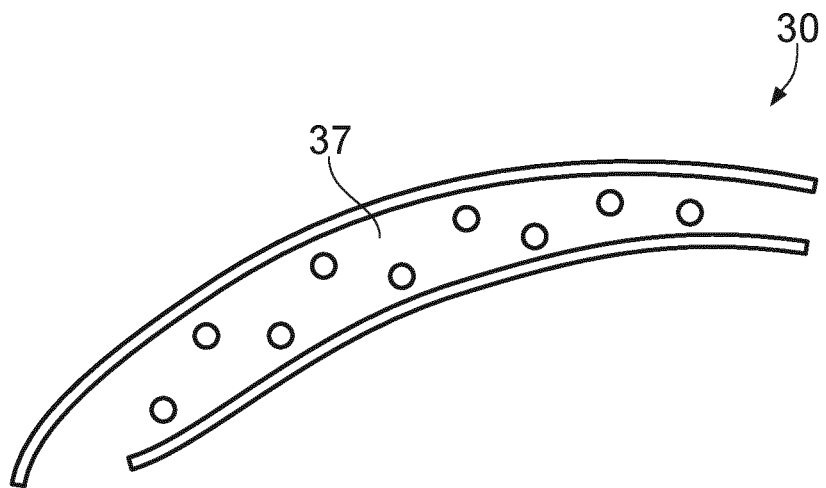
FIGS. 11A, 11B and 11C show alternative embodiments of cooling channels with a modified guide vane.
Figure 11B:
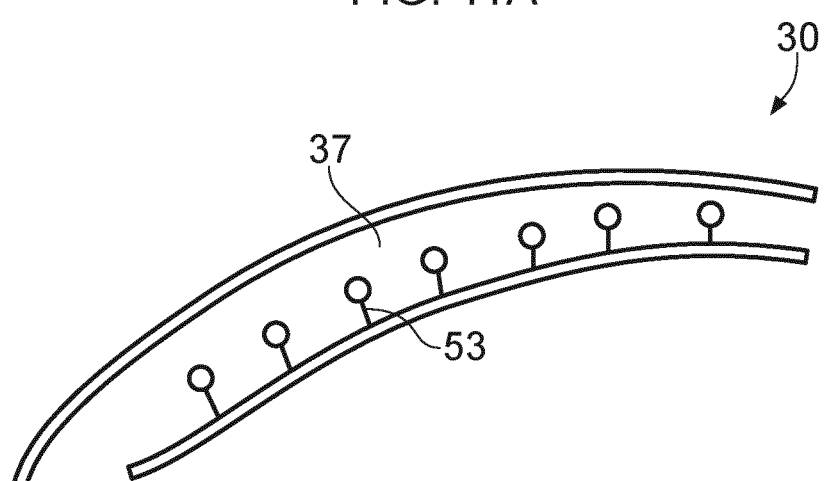
Figure 11C:
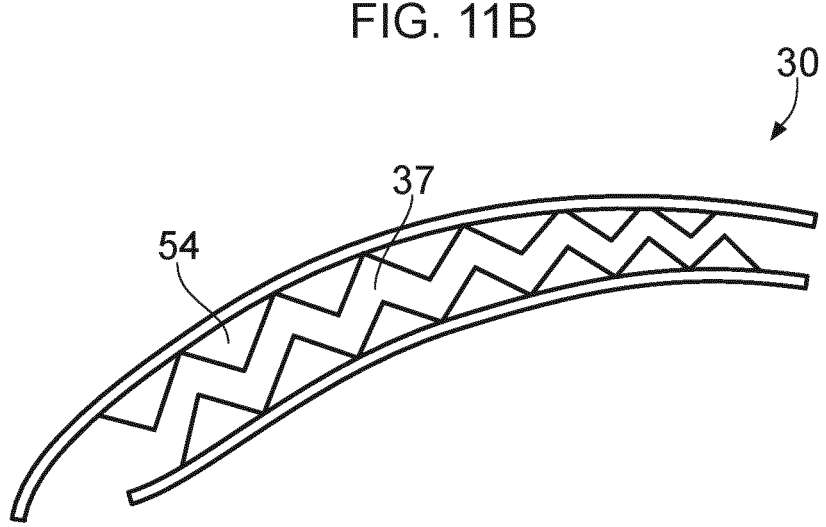

FIGS. 11A, 11B and 11C illustrate alternative arrangements of conduits within the cavity 37 of the modified vane 30.

In embodiment 11A the conduits are staggered with respect to the central line of the vane to maximise contact with the air flowing through the cavity.

In embodiment 11 B, each conduit is connected to the inner wall of the pressure side of the vane by a heat bridge 53. The heat bridge transfers heat to the wall of the vane and the outer surface of the conduit is positioned towards the centre of the vane to maximise heat transfer from the surface of each conduit.

FIG. 11C illustrates a still further embodiment of the coolant conduits within the cavity 37 of the modified vane 30. In this embodiment the channels or conduits are arranged within a zig-zag profile 54 along the inner walls of the vane thereby dissipating heat to the walls of the vane and additionally to the airflow within the vane cavity 37.

It will be recognised that any profile of internal cooling channels or conduits may be used to optimise the heat dissipation for a given engine design. By calculating the heat dissipation required and the area available within the vanes the heat dissipation surfaces can be defined.

The inlets to the vane cavity described herein may be in a variety of forms. For example, a plurality of apertures may be provided behind the leading edge of the suction surface of the blade to maintain the structure of the vane whilst allowing the air to flow into the cavity.

The individual modified vanes making up the OGV structure may be fluidly connected together by means of a first manifold at the hub and a second manifold at the outer ring of the structure. Coolant can then flow conveniently through each of the modified vanes and be returned to the gearbox to effect cooling.

Alternatively, or additionally, each modified vane may be independently used to effect cooling. For example, by using a plurality of control valves coolant may be arranged to selectively flow in one or more of the modified vanes. This may thereby provide controllable cooling to allow the coolant to be reduced in temperature by a controlled amount. By selectively controlling the volume of coolant passing through the cooling arrangement provided by the modified vanes the cooling can be accurately controlled. For example, if a small amount of cooling is needed a single vane may be activated.

Alternatively, if the gearbox (for example) is at an extreme temperature more, or all, modified vanes may be activated to cause maximum cooling. Cooling may be activated according to ambient conditions, such as taxiing or flight in combination with the gearbox temperature. A suitable control arrangement may detect such conditions and control the flow of coolant to, from and within the modified OGV structure accordingly. For example, on engine start in cold climates it may be desirable to deactivate cooling to allow the gearbox oil to reach a desired temperature. Once the target oil temperature is reached, cooling can then be activated and controlled to maintain the gearbox oil to within a predetermined operational range.

Figure 12B:
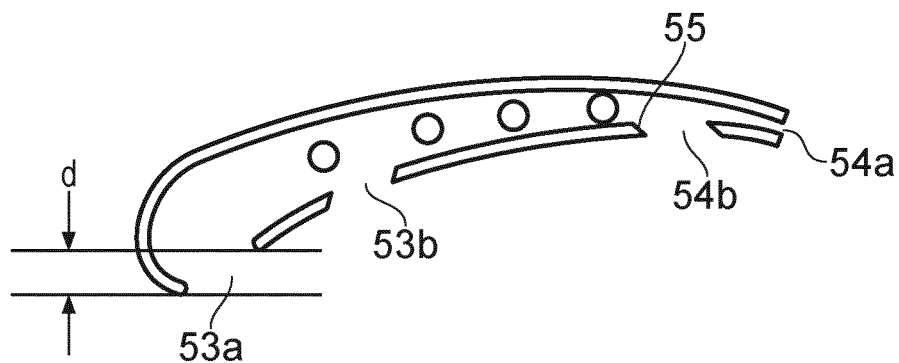
FIGS. 12A and 12B show inlet and outlet arrangements for a modified guide vane described herein.
Figure 12A:
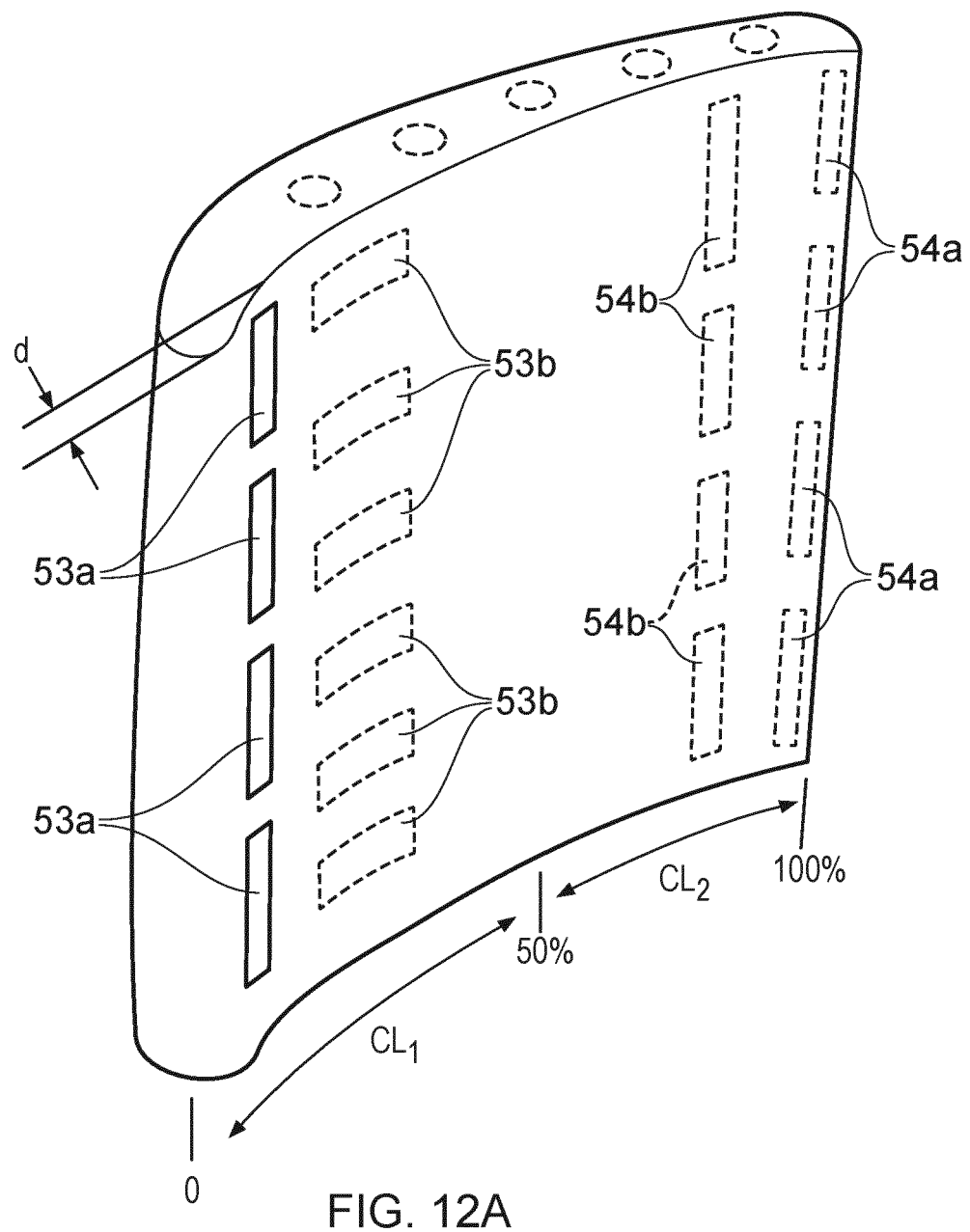

FIGS. 12A and 12B describe the positioning of the inlets and outlets to the internal cavity 37 of the modified vanes described above.

FIG. 12A illustrates alternative arrangements of the air inlets to the cavity. In one arrangement the inlets may be in the form of a plurality of discrete inlets 53a arranged radially along the vane outwards from the hub portion. Each inlet 53a is separated by a portion of the vane to maintain the structural integrity of the vane and to maintain the normal aerodynamic performance of the vane. In this arrangement the inlets are arranged so as to be hidden or spaced from the leading tip of the suction side of the vane and spaced therefrom by the distance d illustrated in FIG. 12A and as described above. The distance d prevents FOD entering the inlets 53a. In an alternative arrangement the inlets may be arranged on the surface of the pressure surface of the vane to allow a flow of air into the cavity within the modified vane to effect cooling. This is illustrated by references 53b.

Here the inlets are located along the chord of the vane i.e. towards 50% of the length of the chord as illustrated by the scale at the root of the modified vane in FIG. 12A. As shown the inlets are located towards the leading edge of the vane.

Similarly, at the trailing edge of the vane, the outlets may be arranged a along the very tip of the vane, represented by reference numerals 54a or may be spaced towards the 50% length of the chord as illustrated by reference numerals 54b.

FIG. 12B illustrates a cross-section through the modified vane shown in FIG. 12A. As illustrated the inlets may be located at positions 53a or 53b and the outlets located at positions 54a or 54b. The inlets and outlets 53b and 54b may be positioned at any suitable position along the chord. Alternatively a combination of positions may be used, for example inlets at positions 53a and outlets at positions 54b and/or inlets at 54b and outlets at 54a. Still further the inlets and outlets may be staggered or alternating between different configurations to blend the flow of air leaving the cavity to prevent unwanted turbulence.

Still further the inlet and/outlets may be controllable in respect of their open areas, for example between a fully open position to a fully closed position. This may be realised by a simple sliding door arrangement and associated actuators allowing the airflow into and out of the cavity to be independently and selectively controlled. This advantageously allows a control arrangement to control the heat dissipation and/or the turning effect of the vanes by removing the effect of the inlet and/or outlet ports on the airflow.

Any suitable material combination may be used. Example combinations include, but are not limited to:

A titanium (or titanium alloy) with internal copper channels

An aluminium (or aluminium alloy) with an internal metallic tubing channel

A carbon fibre composite vane with internal metallic structure defining the channels The skilled person, provided with the teaching herein, will recognise that any suitable combination of the above examples may be conveniently and advantageously used.

The inlet and outlet apertures may be any suitable shape, the apertures shown in FIGS. 12A and 12B being only illustrative.

As illustrated in FIG. 12B the inlets and outlets may additionally be tapered as shown by reference numeral 55 according to the flow direction of the air.

Specifically, the cavity cross-sectional area will have a direct effect on the cavity airflow speed and mass flow. The cavity may be designed to have a diffusing flow just after the inlet and then an accelerating flow before the outlet. This may advantageously optimise the Reynolds number through the cavity. For example, with reference to FIG. 14, the size of A1 and A2 may be approximately 0.3 to 5 times the size of A3.

Specifically, the relationship may be $\frac{1}{3}*A1 < A3 < 5*A1$ and $\frac{1}{3}*A2 < A3 < 5*A2$.

The pressure surface and/or suction surface may be detachable from the main structure of the vane to allow for access to the internal cavity. This advantageously allows for maintenance and inspection and perhaps cleaning of the surfaces of each of the coolant channels located with the vane cavity. The attachment may be by any suitable means, for example recessed aerospace grade screw fixtures or the like.

The inventor has established that designing an OGV with an internal heat transportation medium (such as oil) where the majority of the 'wet surface' of the cool airflow (i.e. the surfaces against which the air impinges) is led through the internal cavity of the OGV where the cooling air flow speed can be reduced to advantageously reduce the flow losses. It has been established that the amount of wet surface using only the outside of the vane profile is one limiting factor for using OGVs as heat exchangers. Furthermore, a lot of the vanes have to be used for cooling and so it is advantageous to increase the wet surface used for cooling (available wet surface area for cooling per vane). With that in mind, in one arrangement fins may be used around the conduits to increase the wet surface and optimise the surface area and thereby heat transfer.

Figure 13:
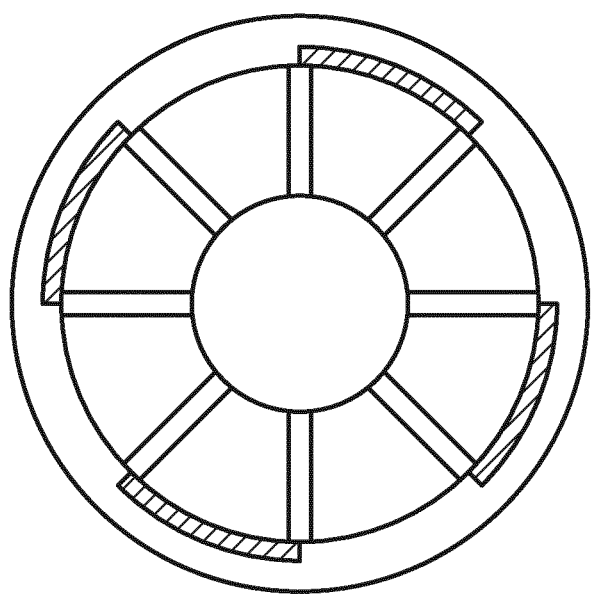
FIG. 13 is an end view of a OGV structure illustrating serial connection of adjacent modified guide vane cooling.

FIG. 13 illustrates that the present disclosure may be used in combination with conventional surface cooling of the surface of the fan bypass channel. Perhaps in series as described above and/or individually controlled. The inner surfaces shown could be coupled to the cooling channels of the vanes.

Figure 14:
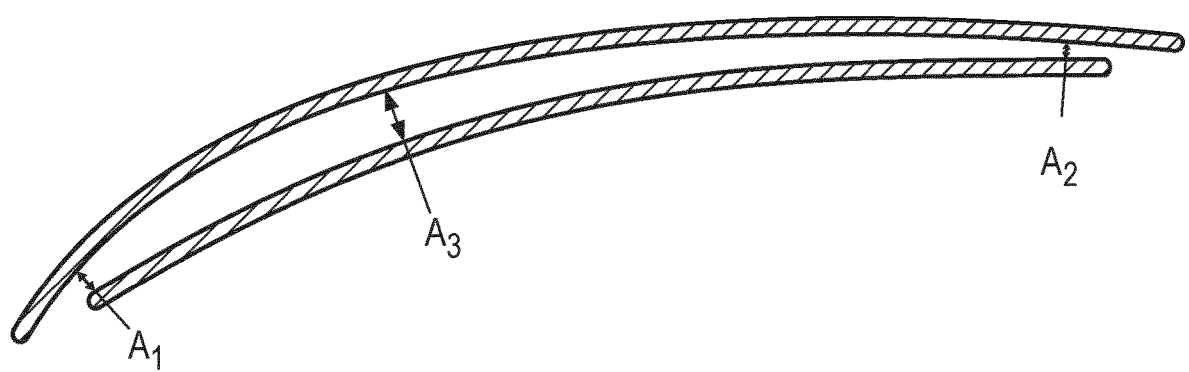
FIG. 14 is a cross-section through a guide vane illustrating the cross-sectional areas of inlet outlet and central region of the cavity.
Figure 15A:
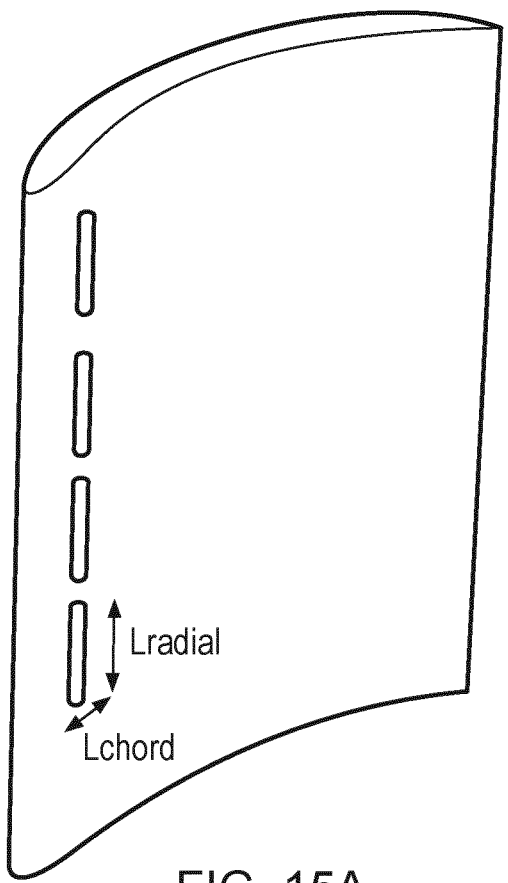
FIGS. 15A and 15B illustrate an optimal and sub-optimal configuration of guide vane inlet profiles (respectively).
Figure 15B:
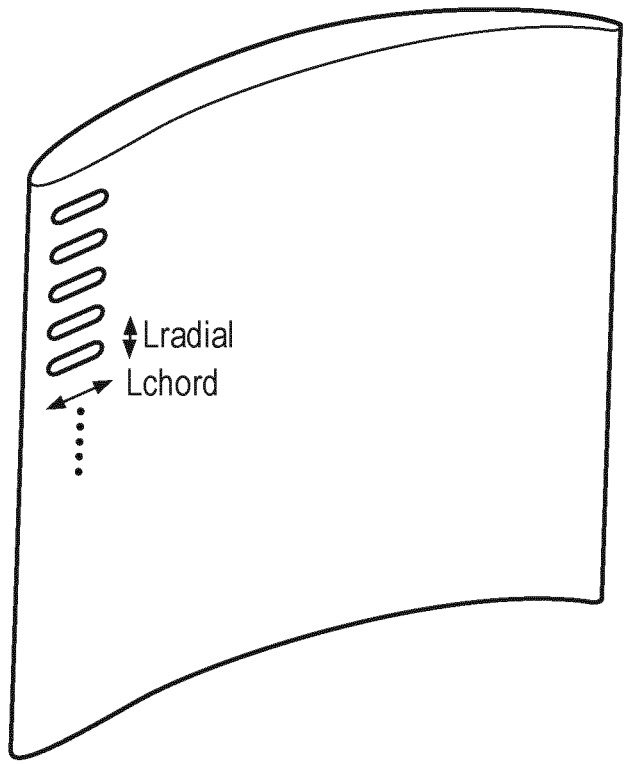

FIG. 14 illustrates a cross-section through a vane described herein. Here the cross-sectional areas at the leading edge (A1), trailing edge (A2) and central region (A3) have the general relationship described above.

The invention claimed is:

1. An outlet guide vane (OGV) structure for a gas turbine engine, the OGV structure comprising:

a plurality of radially extending guide vanes;

wherein at least one guide vane in the plurality of radially extending guide vanes comprises:
a pressure surface defining a first side of the at least one guide vane and an opposing suction surface defining a second side of the at least one guide vane; and
at least one air inlet allowing air to pass into at least one internal cavity within the at least one guide vane and at least one air outlet arranged on a trailing edge allowing the air to exit the at least one internal cavity, the at least one internal cavity being defined between the first side and the second side of the at least one guide vane;
wherein at least one conduit is within the at least one internal cavity and configured to communicate a fluid therethrough;
wherein the at least one air inlet is arranged upstream of the at least one air outlet in a direction of airflow over the at least one guide vane, and the at least one air inlet is arranged only through the pressure surface of the at least one guide vane and spaced from a leading edge of the opposing suction surface.

2. The OGV structure of claim 1, wherein
the at least one air inlet is arranged in the first 50% of a chord length of the at least one guide vane measured from a leading edge to the trailing edge of the at least one guide vane.

3. The OGV structure of claim 2, wherein the at least one air inlet is arranged in the first 25% of the chord length of the at least one guide vane measured from the leading edge to the trailing edge of the at least one guide vane.

4. The OGV structure of claim 1, wherein the OGV structure comprises a primary axis corresponding to an axis of air entering the engine, wherein a portion of the leading edge of the opposing suction surface of the at least one guide vane extends in a direction perpendicular to the primary axis to overlap the pressure surface of the at least one guide vane such that the pressure surface of the at least one guide vane is not visible when viewed along the primary axis of the OGV structure.

5. The OGV structure of claim 4, wherein the at least one air inlet is arranged in a portion of the pressure surface that is not visible when viewed along the primary axis of the OGV structure.

6. The OGV structure of claim 5, wherein a leading edge of the at least one air inlet is spaced by a predetermined distance from a most distal edge of the leading edge of the opposing suction surface measured in a direction perpendicular to the primary axis of the OGV structure.

7. The OGV structure of claim 1, wherein the at least one internal cavity comprises: (a) a plurality of conduits each extending radially through the at least one guide vane and each being spaced along a length of the at least one guide vane measured along a chord of the at least one guide vane and/or (b) a plurality of conduits each extending along the length of the at least one guide vane measured along a part of a chord of the at least one guide vane and each being spaced radially through the at least one guide vane.

8. The OGV structure of claim 7, wherein the at least one guide vane comprises either: (a) a plurality of conduits extending radially within the at least one guide vane and a manifold located at each radial end of the plurality of conduits allowing for fluid communication between adjacent conduits and/or (b) a plurality of conduits extending along a chord within the at least one guide vane and manifolds located at proximity to the leading and the trailing edge allowing for fluid communication between adjacent conduits.

9. The OGV structure of claim 1, wherein the at least one conduit is arranged to extend from and to a portion of the at least one guide vane proximate to a central hub portion of an attaching structure to which each vane is attached, or to a portion of the at least one guide vane proximate to an outer ring portion of the attaching structure to which each vane is attached.

10. The OGV structure of claim 1, wherein the at least one conduit has a fluid inlet and a fluid outlet and alternates in radial direction along a chord direction of the at least one guide vane.

11. The OGV structure of claim 1, wherein a cross-sectional area of the at least one air inlet is less than a cross-sectional area of the at least one internal cavity at a position between the at least one air inlet and the at least one air outlet measured along a chord length of the at least one guide vane.

12. The OGV structure of claim 1, wherein a plurality of inlets are provided proximate to a leading edge of the pressure surface of the at least one guide vane and are spaced radially along a length of the at least one guide vane.

13. The OGV structure of claim 1, wherein a plurality of outlets are further provided proximate to the trailing edge of the at least one guide vane and spaced radially along the length of the at least one guide vane.

14. A method of cooling a reduction gearbox of a geared turbo-fan engine, wherein coolant is caused to be communicated to a cooling arrangement comprising a plurality of radially extending guide vanes;
wherein at least one guide vane in the plurality of radially extending guide vanes comprises a pressure surface defining a first side of the at least one guide vane and an opposing suction surface defining a second side of the at least one guide vane, and at least one air inlet allowing air to pass into at least one internal cavity within the at least one guide vane and at least one air outlet arranged on a trailing edge allowing air to exit the at least one internal cavity, the at least one internal cavity being defined between the first side and the second side of the at least one guide vane;
wherein at least one conduit is within the at least one internal cavity and configured to communicate a fluid therethrough;
wherein the at least one air inlet is arranged upstream of the at least one air outlet in a direction of airflow over the at least one guide vane, and the at least one air inlet is arranged only through the pressure surface of the at least one guide vane and spaced from a leading edge of the opposing suction surface.

15. A method of cooling one or more electrical motors of a fan propulsion arrangement, wherein coolant is caused to be communicated to a cooling arrangement comprising a plurality of radially extending guide vanes;
wherein at least one guide vane in the plurality of radially extending guide vanes comprises a pressure surface defining a first side of the at least one guide vane and an opposing suction surface defining a second side of the at least one guide vane, and at least one air inlet allowing air to pass into at least one internal cavity within the at least one guide vane and at least one air outlet arranged on a trailing edge allowing air to exit the at least one internal cavity, the at least one internal cavity being defined between the first side and the second side of the at least one guide vane;
wherein at least one conduit is within the at least one internal cavity and configured to communicate a fluid therethrough;

wherein the at least one air inlet is arranged upstream of the at least one air outlet in a direction of airflow over the at least one guide vane, and the at least one air inlet is arranged only through the pressure surface of the at least one guide vane and spaced from a leading edge of the opposing suction surface.

16. The method of claim 15, wherein one or more of the plurality of radially extending guide vanes are selectively activated to effect cooling of the coolant.

17. The OGV structure of claim 1, wherein a first portion of the at least one conduit is in direct contact with an inner surface of the pressure surface and/or an inner surface of the opposing suction surface of the at least one guide vane and a second portion of the at least one conduit is in direct contact with the air flowing through the at least one internal cavity, thereby providing a heat bridge to the at least one guide vane and heat transfer to the air flowing through the at least one internal cavity.

* * * * *